United States Patent [19]

Miyagi et al.

[11] Patent Number: 4,832,467
[45] Date of Patent: May 23, 1989

[54] ELECTROCHROMIC VARIABLE COLOR TONE NONGLARING MIRROR

[75] Inventors: Harutoshi Miyagi, Yokohama; Masazumi Ishikawa, Yokosuka, both of Japan

[73] Assignee: Nissan Motor Co., Ltd., Yokohama, Japan

[21] Appl. No.: 83,486

[22] Filed: Aug. 10, 1987

[30] Foreign Application Priority Data

Aug. 11, 1986 [JP] Japan ................................ 61-186989

[51] Int. Cl.$^4$ .............................................. G02F 1/17
[52] U.S. Cl. ................................................... 350/357
[58] Field of Search ......................................... 350/357

[56] References Cited

U.S. PATENT DOCUMENTS

| | | | |
|---|---|---|---|
| 3,844,636 | 10/1974 | Maricle et al. | 350/357 X |
| 3,990,984 | 11/1976 | Barret et al. | 350/350 R |
| 4,205,988 | 6/1988 | Ozaki et al. | 430/444 X |
| 4,285,575 | 8/1981 | Imataki et al. | 350/357 |
| 4,465,339 | 8/1984 | Baucke et al. | 350/357 |
| 4,613,211 | 9/1986 | Papir et al. | 350/357 |

Primary Examiner—Eugene R. LaRoche
Assistant Examiner—Nathan W. McCutcheon
Attorney, Agent, or Firm—Foley & Lardner, Schwartz, Jeffery, Schwaab, Mack, Blumenthal & Evans

[57] ABSTRACT

The invention relates to a nonglaring mirror which is an electrochromic (EC) device in principle. The mirror comprises a transparent front substrate provided with a transparent first electrode layer, a back substrate provided with a second electrode layer opposite to the first electrode layer, first and second EC layers formed on the first and second electrode layers, respectively, an electrolyte liquid which fills up the space between the two substrates and reflecting means for providing a reflective surface to the second substrate. The material of the first EC layer is an organic polymer which is colorless or very pale in color in its electrochemically reduced state and undergoes electrochemical oxidation in two stages to assume a characteristic color in the first-stage oxidized state and another color in the second-stage oxidized state, and intermediate colors in intermediately oxidized states. It is very favorable to use a polymer made up of repeating structural units of N,N,N',N'-tetraphenyl-p-phenylenediamine. The second EC layer is usually formed of a transition metal oxide, e.g. $WO_3$, which takes on color in its electrochemically reduced state.

7 Claims, 5 Drawing Sheets

ELECTROCHROMIC VARIABLE COLOR TONE NONGLARING MIRROR

BACKGROUND OF THE INVENTION

This invention relates to a nonglaring mirror or variable reflectance mirror which is functional as an electrochromic device.

A variable reflectance mirror can be produced by utilizing a liquid crystal. In principle, such a mirror is a liquid crystal cell having a transparent electrode film on the front side and a reflecting electrode film on the opposite side, and a mixture of a liquid crystal and a pigment occupies the space between the two electrode films. Reflectance of this mirror can be varied by producing an appropriate electric field between the two electrocdes to change the state of the liquid crystal and also the light absorption of the pigment to thereby vary the light transmittance of the liquid crystal layer. However, liquid crystal mirrors have some disadvantages, which depend on the type of the employed liquid crystal, such as blurring of reflected images in reduced reflectance mode use of the mirror or difficulty in sufficiently lowering the reflectance. In another aspect, it is a weakpoint of the liquid crystal mirror that the color tone of the mirror in reduced reflectance mode is inherent to the pigment and is invariable.

Recently electrochromic nonglaring mirrors are under development. Some electrochromic materials undergo two-stage oxidation and two-stage reduction and assume a characteristic color by first-stage oxidation and another color by second-stage oxidation. A typical example of such electrochromic materials is Prussian blue, which assumes blue color in its first-stage oxidized state and yellowish brown color in its second-stage oxidized state and becomes colorless by full reduction. However, some problems are involved in electrochromic devices using Prussian blue. First, Prussian blue formed by a usual electrodeposition method is in its first-stage oxidized state so that an electrochemical reduction treatment of the electrode coated with Prussian blue is indispensable. Besides, to effectively and stably utilize the second-stage oxidation of Prussian blue it is necessary to pay special attention to the composition of the electrolyte solution used in the electrochromic device.

SUMMARY OF THE INVENTION

It is an object of the present invention to provide an electrochromic nonglaring mirror which becomes sufficiently low in reflectance by electrochromic coloration and of which the color tone as well as refeflectance is variable by varying a voltage for electrochromically driving the mirror.

According to the invention, there is provided an electrochromic nonglaring mirror comprising a transparent first substrate of which the inside surface is laid with a transparent first electrode layer, a first electrochromic layer which is laid on the first electrode layer and is formed of an organic polymer which undergoes electrochemical oxidation and reduction at least in two stages and assumes different colors at its respective stages of electrochemical oxidation and becomes sufficiently pale in color in its electrochemically fully reduced state, a second substrate comprising a second electrode layer arranged opposite to the first electrode layer, a second electrochromic layer laid on the second electrode layer, means for holding the first and second substrates spaced from each other and defining a closed space between the two substrates, an electrolyte liquid which occupies the closed space, and reflecting means for providing a reflective surface to the second substrate.

As the organic polymer used in the first electrochromic (EC) layer of this EC nonglaring mirror, a polymer made up of repeating structural units of substituted or unsubstituted N,N,N',N'-tetraphenyl-p-phenylenediamine represented by the following general formula is preferred:

wherein X and X' each represent a hydrogen atom, a halogen atom, an alkyl group having not more than 4 carbon atoms or an alkoxy group having not more than 4 carbon atoms.

Polymers made up of the above defined repeating units, which are substantially linear chain polymers, ae disclosed in Japanese patent application No. 61-122879 filed May 28, 1986 and the corresponding U.S. and West German patent applications.

A polytetraphenylphenylenediamine of this category is almost colorless and transparent in its electrochemically fully reduced state, and the polymer isobtained always in its electrochemically reduced state. The polymer becomes insoluble in most organic solvents when the polymer is once doped with an electron acceptor and then dedoped. The insolublized polymer undergoes two-stage oxidation with considerable changes in its absorption spectrum for visible wavelengths, probably by reason of changes in the absorption energy at transition of $\pi$-electrons by changes of double bonds and unpaired electrons. Reverse to the two-stage oxidation the polymer undergoes two-stage reduction. The polymer assumes a characteristic color in its first-stage oxidized state and turns a different color by second-stage oxidation, and the polymers exhibits intermediate color tones at potential intermediate between the fully reducing potential and the first-stage oxidation potential or between said oxidation potential and the second-stage oxidation potential.

In an EC mirror according to the invention the second EC layer too may be formed of a polymer of the above described category. However, it is rather preferable to use a transition metal oxide which takes on color by electrochemical reduction, such as $WO_3$ for instance, as the material of the second EC layer.

This EC nonglaring mirror allows the users to make a choice of color tone the mirror exhibits in its reduced reflectance mode. Reflectance of this EC mirror can be lowered to a level sufficient for a nonglaring mirror used at night in automobiles and, particularly when a polytetraphenylphenylenediamine is used as the first electrode material, the mirror is excellent in durability.

DETAILED DESCRIPTION OF THE INVENTION

Figure 1:
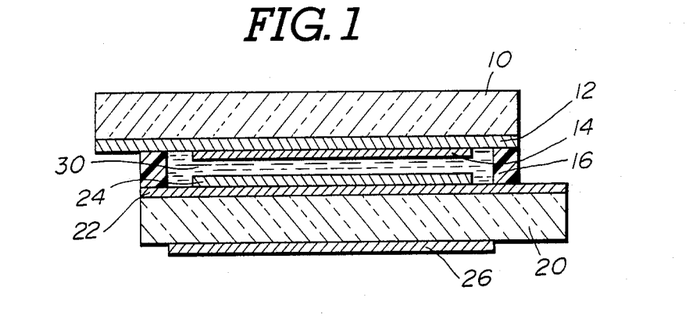
FIG. 1 is a sectional and schematic illustration of an EC mirror as an embodiment of the invention.

FIG. 1 shows a fundamental construction of an EC mirror according to the invention. The mirror has front and back substrates 10 and 20 both of which are transparent in this case and are usually made of glass. A transparent electrode film 12 such as an ITO (indium-tin-oxide) film is deposited on the inside surface of the front substrate 10, and a first EC layer 14 is formed, as a film, on the electrode film 12. For this layer 14 the EC material is an organic polymer which undergoes electrochemical oxidation and reduction at least in two stages and can alternately assume at least two different color tones depending on the degree of its electrochemical oxidation and assumes another color tone in its electrochemically fully reduced state. As such an EC polymer, a polytetraphenylphenylenediamine having repeating units of the foregoing general formula is preferred, though it is also possible to use a polytriphenylamine or polythiophene.

Another transprent electrode film 22 is formed on the inside surface of the back substrate 20, and a second EC layer 24 is formed, as a film, on this electrode film 22. The EC material of the second EC layer 24 is either an organic polymer of the class described above with respect to the first EC layer 14 or a transition metal oxide which takes onn color in its electrochemically reduced state, such as $WO_3$ which is preferred, $MoO_3$, $Nb_2O_5$, $Cr_2O_3$, $Ta_2O_5$, $TiO_2$, $Fe_2O_3$ or $AgO$.

Usually the first EC layer 14 is formed by using a solution of a polymer chosen as the EC material in an organic solvent. That is, the solution is coated on the transparent electrode film 12 by a convenient method such as casting, spin coating or dip coating, followed by degassing and drying of the coating film. Then the polymer coating film (14) is insolubilized by doping the film with an electron accepting dopant such as iodine and then dedoping the film in vacuum. When a transition metal oxide is used as the second EC material the second EC layer 24 is formed by a physical deposition technique such as vacuum deposition or sputtering.

The outside surface of the back substrate 20 is coated with a reflective film 26 the material of which is usually Al or Cr. Alternatively, the reflective film 26 may be formed on the inside surface of the substrate 20 to underlie the electrode film 22. In such a case the back substrate 20 needs not to be transparent. Still alternatively, the whole of the back substrate 20 may be formed of Al or Cr and used as a reflective layer. Another option is replacing the transparent electrode film 22 by a reflective electrode film, which is formed of an electrochemically stable metal such as Pt, Pd or Au.

The two substrates 10 and 20 are held parallel to and spaced from each other a thin layer 16 of a sealing material, which is applied peripherally of the substrates 10, 20 so as to surround the EC layers 14, 24. Where necessary, a transparent spacer (not shown) such as a number of tiny glass spheres may be interposed between the two substrates 10 and 20, viz. between the two EC layers 14 and 24. The space defined between the two substrates 10 and 20 is filled with an electrolyte liquid 30. Usually the electrolyte liquid 30 is a solution of an alkali metal salt such as $LiClO_4$, $LiBF_4$, $LiPF_6$, $KClO_4$, $KBF_4$ or $KPF_6$ in a suitable solvent, which is preferably an organic solvent such as propylene carbonate, acetonitrile, N,N'-dimethylformamide or tetrahydrofuran though it is also possible to use water or a mixture of water and an organic solvent.

In the EC mirror of the above described construction, both the first EC layer 14 and the second EC layer 24 are almost colorless and transparent while no voltage is applied thereto. Therefore, the EC mirror under such condition exhibits a considerably high reflectance. As an appropriate voltage is applied across the two electrodes 12 and 22 so as to make the first electrode 12 positive electrode and the second electrode 22 negative, the first and second EC layers 14 and 24 assume colors characteristic of the respective EC materials so that the EC mirror becomes low in reflectance. The color tone of at least the first EC layer 14 and the degree of reduction in reflectance of the mirror can be controlled by controlling the magnitude of the driving voltage.

To reduce the reflectance of the mirror to a level low enough for a nonglaring mirror used at night in an automobile, viz. below 30% and preferably below 15%, the first EC layer 14 needs to have a sufficient thickness which usually ranges from 2000 to 4000 Å. Though this EC layer 14 may be made thicker than 4000 Å, there is little difference in the possible minimum reflectance of the mirror whether the thickness of the EC layer 14 is 4000 Å or greater.

Figure 2:
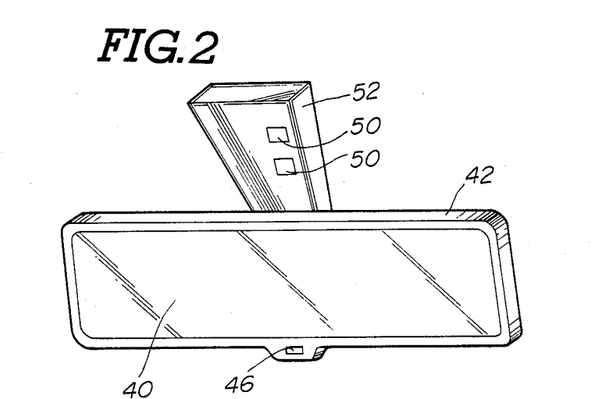
FIG. 2 is a perspective view of an automobile rearview mirror unit using an EC mirror.
Figure 3:
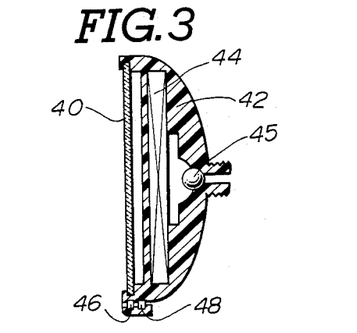
FIG. 3 is a sectional view of the rearview mirror of FIG. 2.

FIGS. 2 and 3 show a rearview mirror unit for an automobile, in which an EC nonglaring mirror according to the invention can be used. The EC mirror, indicated at 40, and a circuit board 44 are fitted in a mirror housing 42. Besides, a light sensor 46 for interior light and another light sensor 48 for exterior light are fited in the housing 42. Switches 50 for electrochromic functioning of the mirror 40 are disposed in a stay 52 which supports the mirror housing 42. Numeral 45 indicates a pivot for adjusting the tilt of the mirror housing 42.

EXPERIMENT 1

A polytetraphenylphenylenediamine having repeating units of the foregoing general formula, wherein both X and X' were hydrogen atom, was dissolved in chloroform. The solution was coated on an ITO electrode film deposited on a glass substrate so as to form a polymer film having a thickness of about 1000 Å and a surface area of about 1 cm². After drying the polymer film was doped with iodine by exposing the film to saturated vapor of iodine at 100° C., and then the film was dedoped in high vacuum.

Figure 4:
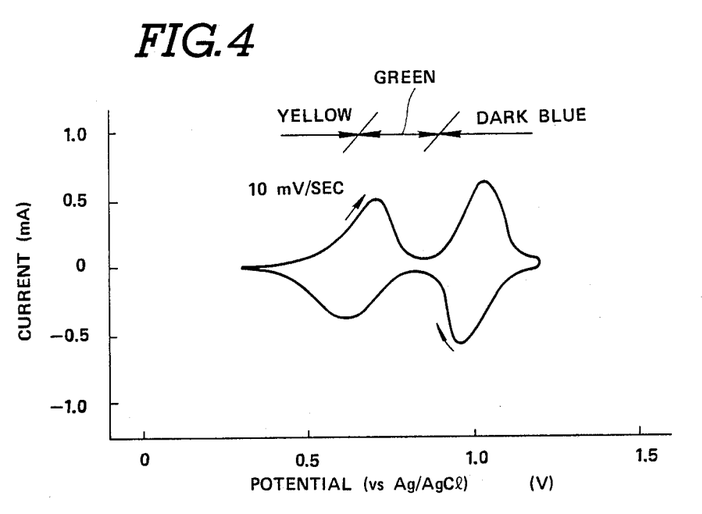
FIG. 4 is a cyclic voltammogram of an insolubilized polytetraphenylphenylenediamine film.

The manner of electrochemical oxidation and reduction of the polytetraphenylphenylenediamine film on the ITO electrode film was tested in an electrolyte solution, which was 1 mol/liter solution of $LiClO_4$ in propylene carbonate, using a platinum wire as the counter electrode and Ag/AgCl electrode as a reference electrode. The potential at the EC electrode was varied at a constant rate of 10 mV/sec. FIG. 4 shows a cyclic voltammogram obtained by this test. FIG. 4 indicates that the tested polymer film underwent two-stage oxidation and two-stage reduction. The polymer film was in a fully reduced state when the potential (vs Ag/AgCl electrode) was below 0.3 V. At about 0.7 V (vs Ag/AgCl) there is a current peak indicating a first-stage oxidation reaction, and at about 1.0 V another current peak indicating a second-stage oxidation reaction.

Figure 5:
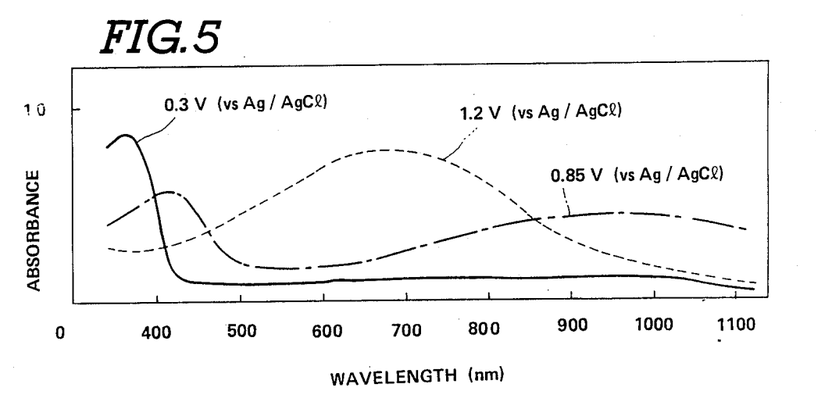
FIG. 5 is a chart showing absorption spectra of the polytetraphenylphenylenediamine film measured while maintaining the polymer film alternately at three different potentials in an electrolyte solution.

In the experiment, absorption spectrum of the above described polymer film on the ITO electrode film was measured in the aforementioned electrolyte solution while maintaining this electrode at a fixed potential (vs Ag/AgCl), which was 0.3 V, 0.85 V or 1.2 V. FIG. 5 shows the obtained absorption spectra, which indicate an absorption peak at 420 nm attributed to the aforementioned first-stage oxidation reaction and another absorption peak at 680 nm attributed to the aforementioned second-stage oxidation reaction. It is seen that the peak at 420 nm diminishes as the potential was raised. By observation with the naked eye, the polymer film assumed yellow color until the potential (vs Ag/AgCl) neared 0.7 V, and assumed green color in the potential range of 0.7–0.9 V (vs Ag/AgCl) and dark blue color at higher potentials.

EXAMPLE

An EC mirror of the construction shown in FIG. 1 was produced by the following process.

A glass sheet was used as the transparent substrates 10 and 20, and each of the electrode films 12 and 22 was transparent film of ITO. The reflective film 26 on the outer surface of the back substrate 20 was formed by depositing Al to a thickness of 1500 Å by sputtering.

The material of the first EC layer 14 was a polymer obtained by polymerizing 4,4''-dibromo-N,N,N',N'-tetraphenylphenylenediamine by using the Grignard reaction. The polymer had an average molecular weight of about 8000. The polymer was dissolved in chloroform in a concentration of 35 g/l, and the solution was applied to the surface of the ITO film 12 on the front substrate 10 by a spin coating method. After drying the coating film the substrate 10 was placed in a vessel, which was evacuated and then filled with $I_2$ vapor. In that state the substrate 10 was kept heated at 100° C. for 4 hr to thereby accomplish doping of the polymer film 14 with iodine. After that the polymer film 14 was developed in high vacuum. The thus obtained polytetraphenylphenylenediamine film 14 had a thickness of about 3000 Å.

The second EC layer 24 was formed by depositing $WO_3$ on the ITO film 22 on the back substrate 20 to a thickness of about 6000 Å by a vacuum deposition method, wherein pressure was $5 \times 10^{-4}$ Torr, substrate temperature was 80° C., rate of deposition was 10 Å/sec.

The front substrate 10 was placed the EC layer 14 upside, and a number of tiny transparent glass spheres (not shown) having a diameter of 40 $\mu$m were scattered over the EC layer 14 at a density of about 15 spheres per squarecentimeter. To form the seal layer 16, an epoxy resin base adhesive was applied by screen printing to the marginal regions of the electrode film 22 on the back substrate 20 so as to leave an opening to be used for intake of the electrolyte liquid. Then the back substrate 20 carrying the second EC layer 24 was placed on the front substrate 10, and the adhesive used as the material of the seal layer 16 was cured by heating under adequate pressure. The electrolyte liquid 30 was 1 mol/liter solution of $LiClO_4$ in propylene carbonate. The liquid 30 was injected by the aforementioned opening in the seal layer 16 into the space in the EC mirror cell, and the opening was closed with the epoxy resin base adhesive.

In the thus produced EC mirror the polytetraphenylenediamine film 14 as formed was in an electrochemically reduced state and was almost colorless and transparent, and the $WO_3$ film 24 as formed was in an electrochemically oxidized state and was colorless and transparent. Therefore, initially the EC mirror was colorless and exhibited high reflectance.

Figure 6:
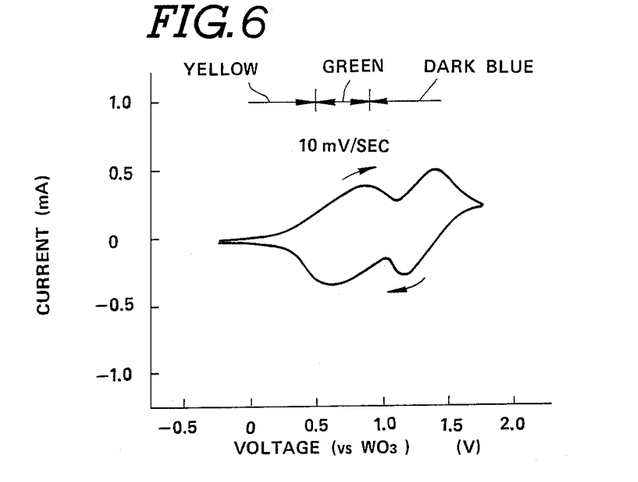
FIG. 6 is a cyclic voltammogram of a polytetraphenylphenylenediamine film on one electrode of an EC mirror produced as an example of the invention.
Figure 7:
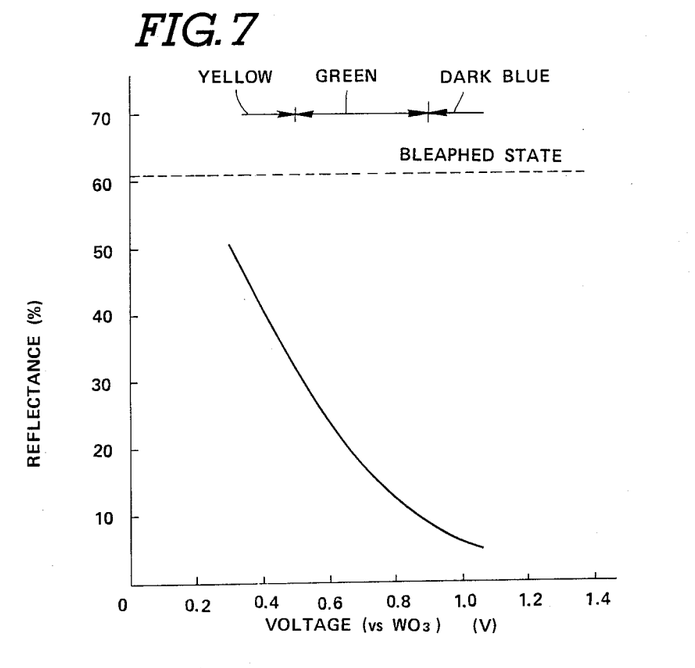
FIG. 7 is a graph showing the relationship between a driving voltage applied to the EC mitrror of the example and reflectance of the mirror.

The electrochromic function of this mirror was examined by voltammetry. The electrode 22 coated with the $WO_3$ film 24 was made the counter electrode, and the scan rate of the potential at the electrode 12 coated with the polymer film 14 was 10 mV/sec. FIG. 6 shows the obtained cyclic voltammogram with respect to the EC polymer film 14 on the working electrode 12. As can be seen the mirror functioned as a good EC device. In the oxidation reaction process the mirror assumed yellow color while the potential at the working electrode (vs $WO_3$ coated counter electrode) was below 0.6 V. In the potential range of 0.6–1.1 V (vs $WO_3$) the mirror exhibited green color and the color changed to dark blue as the potential exceeded 1.1 V, and a gradual decrease in reflectance of the mirror accompanied such changes in color. By application of a reverse voltage to cause reduction reaction of the polymer film 14 the mirror returned to its initial state in both color and reflectance. FIG. 7 shows the relationship between the voltage applied to the polymer coated electrode 12 (vs $WO_3$ coated electrode 22) and reflectance of the EC mirror. When, for example, it is desired to render the color of the mirror green the desire can be met by applying a voltage of 0.7 V to the polymer coated electrode 12, and the reflectance of the mirror becomes about 19%. At need, the initial colorless and highly reflective state can be resumed by application of a voltage higher than 0.9 V, and bleaching can be accomplished by application of a voltage of $-0.5$ V also in this case. Furthermore, a greenish blue color intermediate between green and dark blue can be exhibited to control the reflectance to 10% by application of a voltage of 0.9 V, and a yellowish green color (or reflectance of 30%)

intermediate between yellow and green by application of another voltage of 0.5 V.

Figure 8:
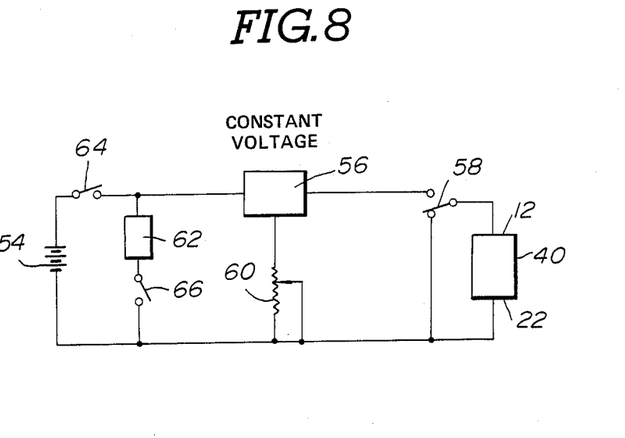
FIG. 8 is a diagram showing a circuit to drive the EC mirror of FIG. 1.

When the EC mirror is used as a rearview mirror in an automobile, the electrochromic function is utilized mostly at night. In the daytime the reflectance of the mirror is desired to be not lower than 50% and preferably not lower than 60%. At night the mirror deserves of being called a nonglaring mirror if reflectance of the mirror can be decreased to less than 30%, and preferably to the extent of 15% or below. The variable color tone EC mirror of this Example proved to be of use as a nonglaring mirror in automobiles, as will be understood from the data in FIG. 7. Furthermore, this EC mirror proved to be very stable to repetition of coloration and bleaching insofar as the driving voltage for coloration is always not higher than 0.8 V. The color tone and reflectance of this EC mirror can easily be controlled with a relatively simple circuit, as shown in FIG. 8 by way of example. In FIG. 8 numeral 40 indicates the EC mirror of FIG. 1 with its first and second electrodes 12 and 22 connected with the driving circuit in the illustrated polarity. In principle the driving circuit is comprised of a battery 54, a constant-voltage circuit 56, a changeover switch 58 and a variable resistor 60 which is used to arbitrarily determine the magnitude of a driving voltage applied to the EC mirror 40. Numeral 62 indicates a relay and numerals 64 and 66 switches.

Figure 9:
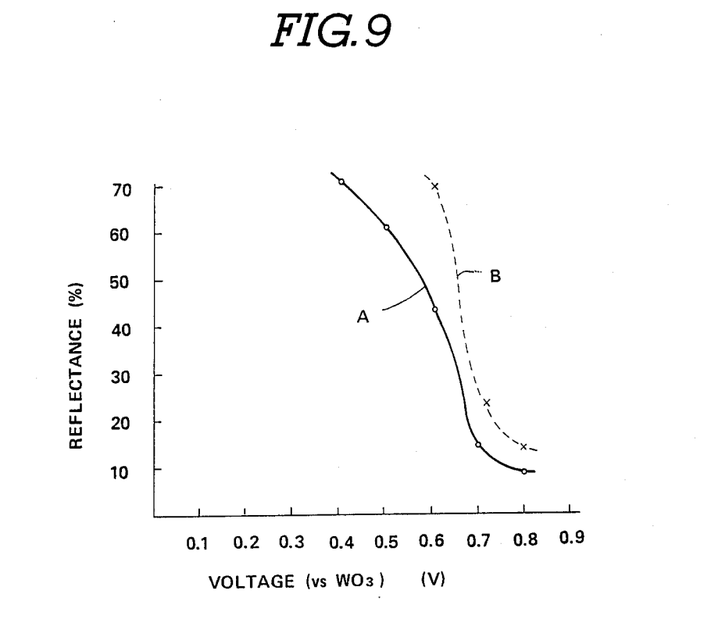
FIG. 9 is a graph showing the relationship between a driving voltage applied to an EC mirror according to the invention and reflectance of the mirror with respect to two examples one of which uses a polytetraphenylphenylenediamine as an EC material and the other a polytriphenylamine.

As minor modifications of the EC mirror of Example 1, an almost identical EC mirror was produced by using the unhalogenated polytetraphenylphenylenediamine used in Experiment 1 as the material of the first EC layer 14 and another almost identical EC mirror by using a polytriphenylamine as the material of the first EC layer 14. In both cases the thickness of the EC layer 14 was about 3000 Å. In these two EC mirrors the relationship between the voltage applied to the polymer coated electrode 12 (vs WO$_3$ electrode 22) and reflectance of the mirror was as shown in FIG. 9, wherein the curve A represents the mirror using the polytetraphenylphenylenediamine and the curve B the mirror using the polytriphenylamine.

EXPERIMENT 2

When an EC mirror according to the invention using only one organic solvent as the solvent in the electrolyte liquid is operated by applying a voltage higher than 0.8 V to the first fitst electrode 12 versus the second electrode 22, subsequent elimination of the applied voltage or application of a reverse voltage sometimes results in that the first EC layer 14 fails to resume the initial colorless and transparent state and remains in a slightly colored state.

Figure 10:
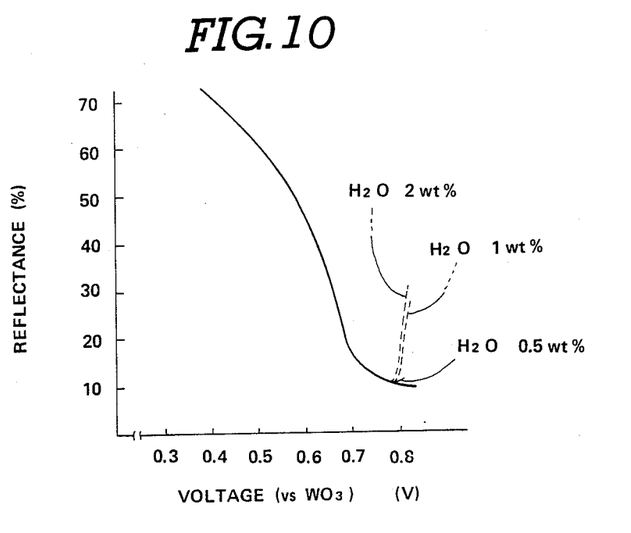
FIG. 10 is a graph showing changes in the relationship between driving voltage and reflectance of the EC mirror using the polytetraphenylphenylenediamine with the content of water in the electrolyte solution in the EC mirror.
Figure 11:
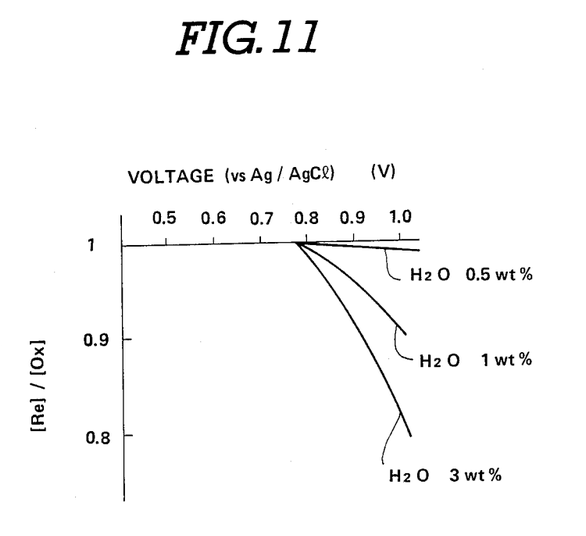
FIG. 11 is a graph showing the influence of the content of water in the electrolyte solution on the relationship between the driven voltage and the ratio of the quantity of charge the EC polymer electrode delivers in reduction reaction to the quantity of charge the same electrode acquires in oxidation reaction.

EC mirror samples were produced generally in accordance with Example 1 except that the first EC layer 14 was formed of the unhalogenated polytetraphenylphenylenediamine used in Experiment 1 and that the content of water in the electrolyte liquid 30 (solution of LiClO$_4$ in propylene carbonate) was precisely controlled to 2 wt%, to 1 wt% or to 0.5 wt%. In every sample the thickness of the first EC layer 14 was 3000 Å. Initially the relationship betwen the voltage applied to the mirror and reflectance of the mirror was as represented by the curve A in FIG. 9. For every sample, coloration by application of a voltage higher than 0.8 V to the polymer coated electrode 12 (vs WO$_3$ electrode) and subsequent bleaching were repeated 100 cycles at 80° C. After that, the relationship between the voltage and reflectance was found to be as shown in FIG. 10. In the samples containing 1 wt% or 2 wt% of water in the electrolyte liquid, there occurred a great change in the dependence of reflectance of the mirror on driving voltages higher than 0.8 V, but only a very little change occurred in the sample containing 0.5 wt% of water. Electrode samples having the same polytetraphenylphenylenediamine film were subjected to repeated oxidation and reduction in 1 mol/liter solution of LiClO$_4$ in propylene carbonate containing 3 wt%, 1 wt% or 0.5 wt% of water at 80° C. A platinum wire was used as the counter electrode and Ag/AgCl electrode as a reference electrode. After repeating the oxidation and reductin 100 cycles, the relationship between the voltage applied to the EC electrode sample (vs Ag/AgCl) for oxidation and the ratio of the quantity of charge the EC electrode delivered in the reduction reaction to the quantity of charge in the same electrode acquired in the oxidation reaction was as shown in FIG. 11. As can be seen, in the electrolyte solution containing 1 wt% or 2 wt% of water there occurred a considerable decrease in the quantity of charge delivered in the reduction reaction, which means incompleteness of bleaching, when the oxidizing voltage was higher than 0.8 V.

Considering the results of this experiment, it is possible that the reason for incomplete bleaching after coloration by application of a voltage above 0.8 V is a certain change in the chemical structure of the polymer used as the first EC layer 14 by combining of nucleophilic radicals produced by electrochemical decomposition of water with the low electron density nucleus of the repeating units of the EC polymer.

This phenomenon is not serious when the organic solvent used in the electrolyte solution is truly nonaqueous or does not contain more than 0.5% of water. On the other hand, when the second EC layer 24 is formed of a transition metal oxide represented by WO$_3$ it is effective to add a small amount of water to the electrolyte solution using an organic solvent in improving the response characteristics of the transition metal oxide layer 24. Therefore, it is recommended to operate an EC mirror according to the invention by applying a voltage not higher than 0.8 V between the two electrodes 12 and 22.

What is claimed is:

1. An electrochromic nonglaring mirror, comprising:
a transparent first substrate of which the inside surface is laid with a transparent first electrode layer;
a first electrochromic layer laid on said first electrode layer and formed of an organic polymer which undergoes electrochemical oxidation and reduction in at least two states and assumes different colors at its respective stages of electrochemical oxidation and becomes pale or colorless in its electrochemically fully reduced state wherein said organic polymer is made up of repeating units represented by the following general formula:

wherein X and X' each represent a hydrogen atom, a halogen atom, an alkyl group having not more than 4 carbon atoms or an alkoxyl group having not more than 4 carbon atoms;

a second substrate comprising a second electrode layer arranged opposite to said first electrode layer;

a second electrochromic layer laid on said second electrode layer;

means for holding said first and second substrates spaced from each other and defining a closed space between the two substrates;

an electrolyte liquid which occupies said closed space; and reflecting means for providing a reflective surface to said second substrate.

2. A mirror according to claim 1, wherein said second electrochromic layer is formed of a transition metal oxide which takes on color in its electrochemically reduced state.

3. A mirror according to claim 2, wherein said transition metal oxide is selected from the group consisting of $WO_3$, $MoO_3$, $Nb_2O_5$, $Cr_2O_3$, $Ta_2O_5$, $TiO_2$, $Fe_2O_3$ and AgO.

4. A mirror according to claim 1, wherein aid electrolyte liquid is a solution of a supporting electrolyte in an organic solvent.

5. A mirror according to claim 4, further comprising drive means for applying a DC voltage not higher than 0.8 V across said first and second electrode layers.

6. A mirror according to claim 1, wherein both said second substrate and said second electrode layer are transparent, said reflecting means comprising a reflective metal film coated on the rear surface of said second substrate.

7. A mirror according to claim 1, wherein said second electrode layer is a reflecting metal layer, whereby said reflecting means is incorporated in said second electrode layer.

* * * * *